US012564998B2

(12) United States Patent
Hirano et al.

(10) Patent No.: US 12,564,998 B2
(45) Date of Patent: Mar. 3, 2026

(54) PRODUCTION METHOD FOR PERSONAL CARE PRODUCT

(71) Applicant: Kao Corporation, Tokyo (JP)

(72) Inventors: Takahiro Hirano, Utsunomiya (JP); Shohei Natsui, Ichikai-machi (JP); Yuuya Nakanishi, Fujisawa (JP)

(73) Assignee: KAO CORPORATION, Tokyo (JP)

( * ) Notice: Subject to any disclaimer, the term of this patent is extended or adjusted under 35 U.S.C. 154(b) by 118 days.

(21) Appl. No.: 18/657,817

(22) Filed: May 8, 2024

(65) Prior Publication Data

US 2024/0286340 A1     Aug. 29, 2024

Related U.S. Application Data

(63) Continuation of application No. PCT/JP2022/047779, filed on Dec. 23, 2022.

(30) Foreign Application Priority Data

Dec. 27, 2021     (JP) ................................. 2021-212312

(51) Int. Cl.
  *B33Y 10/00*       (2015.01)
  *B29C 64/112*      (2017.01)
         (Continued)

(52) U.S. Cl.
  CPC .......... *B29C 64/112* (2017.08); *B29C 64/209* (2017.08); *B33Y 10/00* (2014.12);
         (Continued)

(58) Field of Classification Search
  None
  See application file for complete search history.

(56)            References Cited

U.S. PATENT DOCUMENTS

2006/0120981 A1*  6/2006  Avalle ....................... B65B 3/30
                                                424/63
2017/0232676 A1*  8/2017  Jaunet ................... B29C 64/165
                                                264/308
            (Continued)

FOREIGN PATENT DOCUMENTS

CA          2804630 A1     2/2012
JP      2005-294014 A    10/2005
            (Continued)

OTHER PUBLICATIONS

International Search Report and Written Opinion mailed on Feb. 28, 2023, received for PCT Application PCT/JP2022/047779, filed on Dec. 23, 2022, 09 pages including English Translation.

*Primary Examiner* — Mohammad M Ameen
(74) *Attorney, Agent, or Firm* — XSENSUS LLP

(57)            ABSTRACT

A production method for a personal care product applicable to a human body can include a forming step in which a nozzle is moved relative to an object while a composition having fluidity is supplied from the nozzle to the object to form a deposit derived from the composition on the object. A nozzle with a nozzle diameter of 0.01 mm or more and 2 mm or less may be used as the nozzle. In the forming step, the composition can be supplied such that a ratio of a distance between a tip of the nozzle and the object to the nozzle diameter (distance/nozzle diameter) is set to 0.35 or more and less than 3.

20 Claims, 9 Drawing Sheets

(51) Int. Cl.
 *B29C 64/209* (2017.01)
 *B33Y 70/00* (2020.01)
 *B33Y 80/00* (2015.01)
 *B29K 105/00* (2006.01)

(52) U.S. Cl.
 CPC .............. *B33Y 70/00* (2014.12); *B33Y 80/00* (2014.12); *B29K 2105/251* (2013.01); *B29K 2995/002* (2013.01); *B29K 2995/0026* (2013.01); *B29K 2995/0097* (2013.01)

(56) References Cited

U.S. PATENT DOCUMENTS

| | | | |
|---|---|---|---|
| 2018/0043613 A1 | 2/2018 | Krishnan et al. | |
| 2018/0186065 A1* | 7/2018 | Jaunet ................... | B29C 39/025 |
| 2020/0222289 A1 | 7/2020 | Seo et al. | |

FOREIGN PATENT DOCUMENTS

| | | | | |
|---|---|---|---|---|
| JP | 2009-301719 | A | | 12/2009 |
| JP | 2010-149085 | A | | 7/2010 |
| JP | 2019-108308 | A | | 7/2019 |
| JP | 2019 172 578 | A | * | 10/2019 |
| JP | 2023-096499 | A | | 7/2023 |
| JP | 2023-097416 | A | | 7/2023 |
| JP | 7379594 | B1 | | 11/2023 |
| JP | 2023-183379 | A | | 12/2023 |
| KR | 2016-0085073 | A | | 7/2016 |
| KR | 10-2188422 | B1 | | 12/2020 |

\* cited by examiner

PRODUCTION METHOD FOR PERSONAL CARE PRODUCT

CROSS-REFERENCE TO RELATED APPLICATIONS

The present application is a continuation of International Application No. PCT/JP2022/047779, filed Dec. 23, 2022, which claims priority from Japanese Patent Application No. 2021-212312, filed Dec. 27, 2021, the entire content and disclosure of each is hereby incorporated by reference in entirety.

SUMMARY

In one embodiment, a production method for a personal care product applicable to a human body can include a forming step in which a nozzle is moved relative to an object while a composition having fluidity is supplied from the nozzle to the object to form a deposit derived from the composition on the object. A nozzle with a nozzle diameter of 0.01 mm or more and 2 mm or less may be used as the nozzle.

According to one or more embodiments, in the forming step, the composition can be supplied in such a manner that a ratio of a distance between a tip of the nozzle and the object to the nozzle diameter (distance/nozzle diameter) is set to 0.35 or more and less than 3.

DESCRIPTION OF EMBODIMENTS

Figure 1:
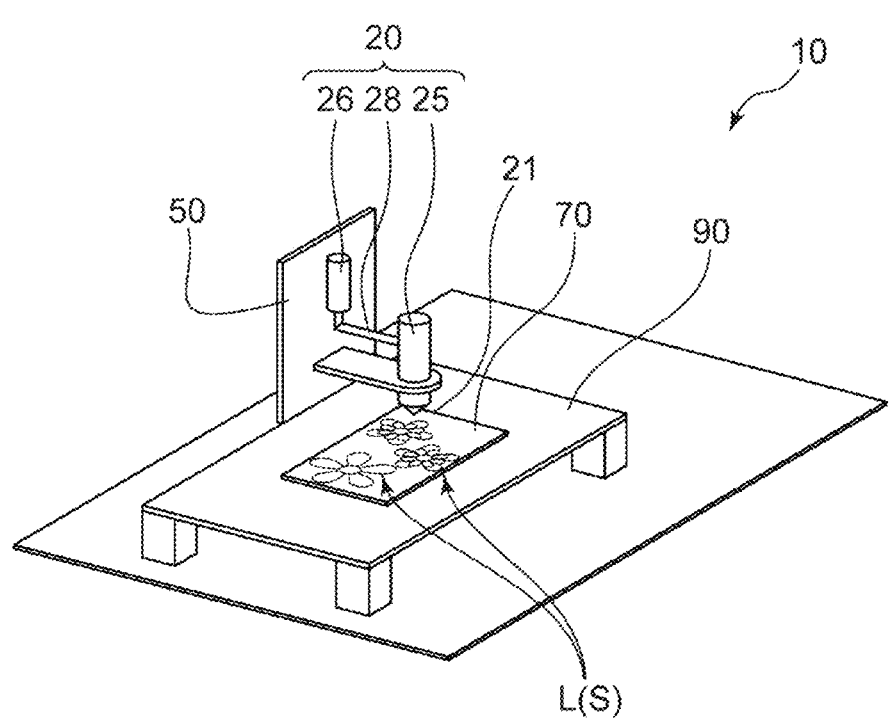
FIG. 1 is a perspective view schematically showing one embodiment of a production apparatus used in a production method of the present disclosure.

In a conventional technique, a composition is fluidized by heating and the fluidized composition is injected and, thereafter, is solidified by cooling. Therefore, over a period from immediately after the injection to the solidification of the composition having fluidity, the composition flows out of the region where the composition is injected, so that the predetermined shape of a shaped article cannot be maintained. That is, with this conventional method, it may be difficult to perform shaping and decoration of a personal care product having a desired shape and dimensions, with high shape accuracy and high dimensional accuracy.

Further, in the conventional technique, no investigation is understood to have been made on increasing shape accuracy and dimensional accuracy required in performing shaping and decoration of a personal care product.

The present disclosure relates to a production method that can efficiently perform shaping and decoration of a personal care product having a desired shape and dimensions, with high shape accuracy and high dimensional accuracy.

Hereinafter, embodiments of the present disclosure will be described with reference to preferred embodiments.

A personal care product produced by the production method of the present disclosure can be applicable to a human body by directly applying the personal care product onto skin, or by applying, spraying, or dropping, onto skin, a liquid obtained by dissolving or dispersing the personal care product in a liquid medium, such as water. In addition, the personal care product may also be a product that applies a fragrance to the human body, for example, a product such as an aroma candle that imparts a relaxation effect to the human body through a fragrance.

The personal care product can be regarded as solid at one atmosphere and 20° C., for instance, according to one or more embodiments of the present disclosure.

Examples of such a personal care product can include cosmetic products, such as makeup cosmetic products, as well as soap and bathing agents. However, the personal care product is not limited to the above.

Examples of the makeup cosmetic product can include eye shadow, foundation, and lipstick.

Lipstick according to one or more embodiments of the present disclosure can contain oil agents and pigments.

The personal care product according to one or more embodiments of the present disclosure can contain cosmetic powder.

The production method of one or more embodiments of the present disclosure can be applicable, for instance, in a case where a composition having fluidity is supplied onto an object and, thereafter, the composition is solidified if necessary to form and shape a deposit derived from the composition on the object, thus decorating the object. In the case where the composition contains cosmetics, for example, an obtained deposit can be used as a solid cosmetic.

It is preferable that the composition having fluidity be liquid itself or a composition containing liquid.

Examples of such a composition include a dispersion liquid (so-called slurry), being a mixture of powder, such as a cosmetic, and a liquid dispersion medium, as well as a solution obtained by dissolving various compounds, such as a cosmetic, in a liquid solvent, as well as a melt obtained by melting by heating a cosmetic or an oil agent as a single body or a composition containing cosmetics. The detail of the composition and the constituent material of the composition will be described later.

An object to which the composition can be supplied is not particularly limited. Examples of the object to which composition is supplied can include a paper, a film, a nonwoven fabric, a metal, a resin, and an already-produced personal care product having a formulation same as or different from the formulation of the composition.

A production apparatus 10 that can be used in the production method according to one or more embodiments of the present disclosure can include a supply part 20 and a nozzle 21, the supply part 20 supplying a composition L having fluidity onto an object 70 to which the composition is supplied (hereinafter also simply referred to as "object"), wherein the nozzle 21 can be integrally disposed to communicate with the supply part 20.

The production apparatus 10 that can be used according to one or more embodiments of the present disclosure can be configured such that a flat plate-like object placement part 90 can be disposed below the nozzle 21 at a position that faces the nozzle 21, and the object 70 can be placed on or fixed to the upper surface of the object placement part 90.

One example of the embodiment having these structures is shown in FIG. 1 and FIG. 3A to FIG. 3C.

According to one or more embodiments, the production apparatus 10 can include a position adjustment part 50 that supports or holds the supply part 20 and the object placement part 90 at predetermined positions.

The position adjustment part 50 can have a position adjustment mechanism that moves the position of the nozzle 21 and/or the object placement part 90 relative to the position of the nozzle 21 or the object placement part 90 in a desired direction. With such a configuration, by moving at least one of either the nozzle 21 or the object placement part 90 in the plane direction, the vertical direction, or the combined direction of the plane direction and the vertical direction, it can be possible to move at least one of either the nozzle 21 or the object 70 on the object placement part 90 relative to the other of either the nozzle 21 or the object 70. The position adjustment mechanism may be manually operated, or may be automatically controlled in response to an electric signal transmitted from a sensor or the like.

The supply part 20 can be regarded as a member that feeds the composition L having fluidity to the object 70. The supply part 20 can include a liquid feeding part 25 and a composition storage part 26.

The liquid feeding part 25 can be connected in communication with the composition storage part 26 via a flow passage 28. With such a configuration, it can be possible to supply continuously or discontinuously, to the nozzle 21, the composition L supplied into the liquid feeding part 25 from the composition storage part 26, or it can be possible to stop the supply.

For the liquid feeding part 25 having such a configuration, a jet dispenser, a mohno dispenser, or a screw dispenser may be used, the jet dispenser being capable of discharging the composition L in the form of droplets, the mohno dispenser and the screw dispenser being capable of continuously discharging the composition L.

According to one or more embodiments, the composition storage part 26 can be formed such that one end of the composition storage part 26 is connected to a pump or a means for pressurizing air or the like, thus allowing the composition L stored in the composition storage part 26 to be force-fed to the liquid feeding part 25 via the flow passage 28.

The nozzle 21 can be a tubular member that supplies the composition L toward the object 70 from the supply part 20. The nozzle 21 can have a flow passage for the composition L along a flow direction R of the composition L, the flow passage being a space formed in the nozzle 21. The nozzle tip, which is one end portion of the nozzle 21, can have a supply port for the composition L, and the other end portion of the nozzle 21 can be connected in communication with the above-described supply part 20.

The constituent material of the nozzle may not be particularly limited and, for example, a metal or a plastic may be adopted.

A nozzle diameter D1 (see FIG. 2 and FIG. 3A) of the nozzle 21 can represent the length of the internal space. From the viewpoint of suppressing nozzle clogging, stabilizing continuous discharging, or preventing pressure loss, the nozzle diameter D1 can be preferably 0.01 mm or more, more preferably 0.1 mm or more, and even more preferably 0.2 mm or more.

From the viewpoint of achieving fine coating or suppressing liquid drip, the nozzle diameter D1 can be preferably 2 mm or less, more preferably 1 mm or less, and even more preferably 0.6 mm or less.

Figure 2A:
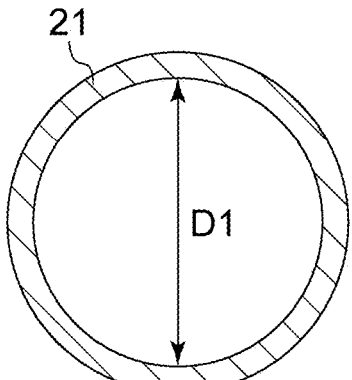
FIG. 2A to FIG. 2C are cross-sectional views schematically showing an example of a nozzle related to the production apparatus shown in FIG. 1.
Figure 2B:
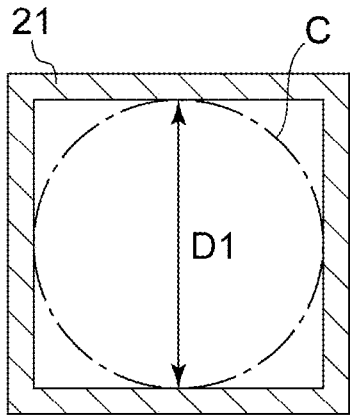
Figure 2C:
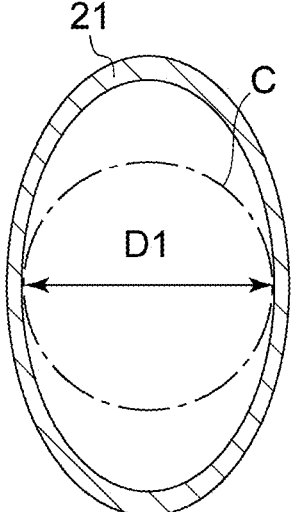

The nozzle diameter D1 can be synonymous with the inner diameter of the nozzle 21 in the case where the nozzle 21 has a circular shape, that is, synonymous with the length of the nozzle 21 in cross section (see FIG. 2A). In the case where the nozzle 21 does not have a circular shape, a diameter D1 of an inscribed circle C (see FIG. 2B and FIG. 2C) inscribed within an inner surface of the nozzle 21 in a cross section orthogonal to the flow direction R of the nozzle 21 can be regarded as the nozzle diameter. FIG. 2B shows an example in which the nozzle 21 has a rectangular shape, and FIG. 2C shows an example in which the nozzle 21 has an elliptical shape, though embodiments of the present disclosure are not limited to the shown shapes.

From the viewpoint of suppressing nozzle clogging, stabilizing continuous discharging, or reducing pressure loss, the cross-sectional area of the nozzle 21 in a cross section orthogonal to the flow direction R of the composition L in the nozzle 21 can be preferably $0.00008 \text{ mm}^2$ or more, more preferably $0.008 \text{ mm}^2$ or more, and even more preferably $0.03 \text{ mm}^2$ or more.

From the viewpoint of achieving fine coating or suppressing liquid drip, the above-described cross-sectional area of the nozzle 21 can be preferably $3.2 \text{ mm}^2$ or less, more preferably $1 \text{ mm}^2$ or less, and even more preferably $0.4 \text{ mm}^2$ or less.

According to one or more embodiments of the present disclosure, the production method can include a forming step in which the nozzle 21 is moved relative to the object 70 while the composition L having fluidity is supplied from the nozzle 21 to the object 70 to form a deposit derived from the composition on the object.

Constitutional elements substantially equal to the corresponding constitutional elements in the above-described embodiment are given the same reference symbols, and the description of such constitutional elements will be omitted. For constitutional elements that are not specifically described, the description of the corresponding constitutional elements in the above-described embodiment can be suitably applied.

In the production method of one or more embodiments of the present disclosure, the composition L may be discontinuously supplied to the object 70 in the form of droplets, or may be linearly continuously supplied in a straight line shape, a curved shape, or a shape obtained by combining a straight line shape and a curved shape.

In the description made hereinafter, for the sake of convenience of the description, the description will be made by taking, as an example, a case where a cosmetic slurry containing solid cosmetic powder and a liquid medium is used as the composition L, and the slurry is linearly continuously supplied to form and shape a linear deposit, though embodiments of the present disclosure are not so limited to this specific case.

According to one or more embodiments, prior to the forming step, first, the object 70 can be placed on the object placement part 90. In such a state, the nozzle 21 and the object 70 can be moved relative to each other to dispose the nozzle 21 at a predetermined position above the object 70 in a state of facing the object 70. Such a position of the nozzle 21 can be regarded as a position at which supply of the composition L to the object 70 is started.

At this point of operation, it may be preferable that a clearance be provided between the tip of the nozzle 21 and the object 70, so that the nozzle 21 and the object 70 are not in contact with each other. The nozzle 21 and the object 70 can be moved relative to each other by the position adjustment mechanism of the position adjustment part 50.

Figure 3A:
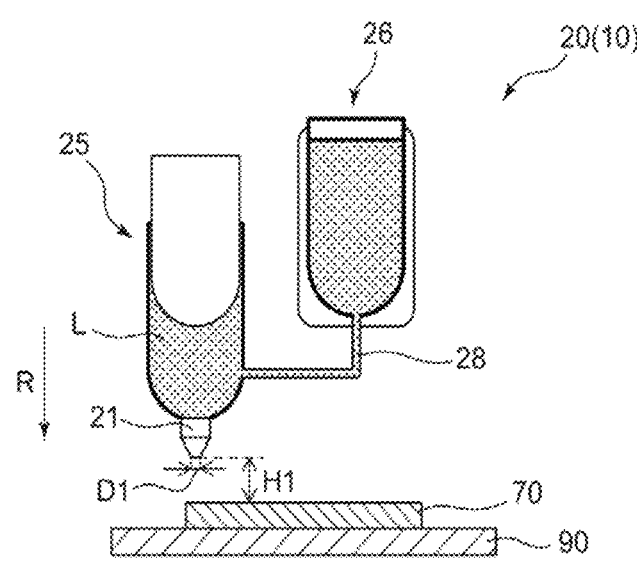
FIG. 3A to FIG. 3C are cross-sectional views schematically showing one embodiment of a step of forming a deposit by the production method of the present disclosure.

One example of such operations is shown in FIG. 3A.

Subsequently, at least one of either the nozzle 21 or the object 70 can be moved relative to the other of either the nozzle 21 or the object 70 while the composition L is supplied from the nozzle 21 toward the object 70 to form and shape a deposit S derived from the composition on the object 70 (forming step). At this point of operation, the composition L can be continuously supplied from the nozzle 21.

The direction in which the nozzle 21 can be moved relative to the object 70 may be the plane direction, the vertical direction, or the combined direction of the plane direction and the vertical direction according to the plan shape or the three-dimensional shape of a target deposit S or according to a design to be drawn.

In this specification, "design" can mean, for example, various characters, such as Japanese characters including hiragana and katakana, alphabet, Arabic numerals, Roman numerals, or characters of various foreign countries, as well as figures or geometries formed by straight lines, curved lines, or combinations of straight lines and curved lines, as well as shapes of symbols, colors, patterns, or combinations of symbols, colors, and patterns.

These designs can be colored in a color same as or different from an original ground color of the object 70 to which the design is provided, thus being made visible, for instance.

Figure 3B:
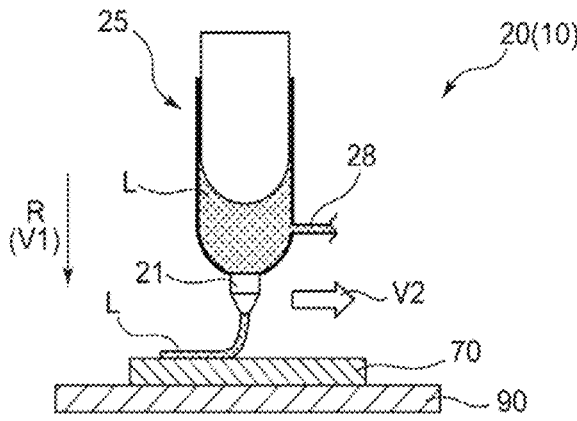

One example of such an operation is shown in FIG. 3B.

It may be sufficient that the composition L used in the forming step can have fluidity at least at the time when the composition L is supplied to the object 70. Specifically, for example, a composition L may be used that is obtained by heating the composition L, which is solid at one atmosphere and 30° C., to more than 30° C. during supply of the composition L to the object 70 to cause the composition L to exhibit fluidity due to melting or the like. Alternatively, a composition L having fluidity, such a composition being liquid at one atmosphere and 30° C., may be used in a non-heated state.

In either case, from the viewpoint of improving uniform dispersibility of materials contained in the composition or increasing stability of supply, the viscosity of the composition L at the temperature at which the composition L is supplied from the nozzle 21 can be preferably 0.1 Pa·s or more and 1 000 Pa·s or less. The detail of a preferable viscosity of the composition L will be described later.

Of these compositions, it may be preferable to use, as the composition L supplied from the nozzle 21 toward the object 70, a composition that has fluidity within a temperature range of preferably 30° C. or less and 0° C. or more. By using such a composition L, it can be possible to obtain an advantageous effect of eliminating the necessity of heating and melting a composition.

In the forming step, according to one or more embodiments, the composition L can be supplied onto the object 70 in such a manner that the ratio of a distance H1 between the tip of the nozzle 21 and the object 70 to the nozzle diameter D1 (distance H1/nozzle diameter D1) maintains a predetermined relationship.

To be more specific, from the viewpoint of preventing pushing of a discharged deposit by the nozzle or achieving a small line width, the ratio of the distance H1 to the nozzle diameter D1 (H1/D1) in the forming step can be preferably 0.35 or more, more preferably 0.5 or more, even more preferably 0.55 or more, and yet even more preferably 0.7 or more.

From the viewpoint of excellent followability of a discharged deposit with respect to the relative movement between the nozzle and the object, the ratio of the distance H1 to the nozzle diameter D1 (H1/D1) in the forming step can be preferably less than 3, more preferably 2.5 or less, and even more preferably 2 or less.

The above-described H1/D1 may be maintained at a constant value from the start to the end of the forming step, or may vary within the ranges described above.

The nozzle diameter D1 in the forming step may be set to a value which falls within the above-described ranges.

From the viewpoint of suppressing contact between the nozzle and the object, the distance H1 between the tip of the nozzle 21 and the object 70 in the forming step can be preferably 0.15 mm or more, more preferably 0.2 mm or more, and even more preferably 0.25 mm or more.

From the viewpoint of improving followability of a discharged deposit with respect to the relative movement between the nozzle and the object, the above-described distance H1 can be preferably 5 mm or less, more preferably 2.5 mm or less, and even more preferably 2 mm or less.

The distance H1 can be suitably adjusted by the above-described position adjustment part 50, for example.

In the forming step, it may also be preferable to supply the composition L onto the object 70 with the ratio between a supply speed V1 of the composition L supplied from the nozzle 21 toward the object 70 and a relative moving speed V2 of the nozzle 21 relative to the object 70 in the plane direction maintained within a predetermined range.

To be more specific, the lower limit of the ratio of the relative moving speed V2 to the supply speed V1 of the composition L (V2/V1) in the forming step may not be particularly limited in terms of allowing the same nozzle to produce deposits having a plurality of line widths. However, from the viewpoint of suppressing an excessive increase in line width of a deposit with respect to the nozzle diameter D1 or improving production capacity, the lower limit of the ratio (V2/V1) can be preferably 0.1 or more, more preferably 0.4 or more, and even more preferably 0.6 or more.

From the viewpoint of suppressing unanticipated interruption or tearing of a deposit caused by insufficient supply of the composition L, the ratio of the relative moving speed V2 to the supply speed V1 of the composition L (V2/V1) in the forming step can be preferably 2 or less, more preferably 1.7 or less, and even more preferably 1.5 or less.

The above-described V2/V1 may be maintained at a constant value from the start to the end of the forming step, or may vary within the ranges described above.

From the viewpoint of improving production capacity, the supply speed V1 of the composition L in the forming step can be preferably 1 mm/s or more, more preferably 3 mm/s or more, and even more preferably 5 mm/s or more.

The supply speed V1 of the composition L in the forming step may not be particularly limited provided that the composition L can be supplied. However, from a practical viewpoint, the supply speed V1 of the composition L in the forming step can be preferably 5 000 mm/s or less, more preferably 500 mm/s or less, and even more preferably 200 mm/s or less.

In the case where the above-described dispenser is used as the liquid feeding part 25 of the supply part 20, for example, the supply speed V1 can be suitably changed by suitably adjusting the rotational speed of a rotor or by adjusting the shape or the inner diameter of the nozzle 21 or the viscosity of the composition L, for example.

From the viewpoint of improving production capacity, in the forming step, the relative moving speed V2 of the nozzle 21 relative to the object 70 in the plane direction can be preferably 1 mm/s or more, more preferably 3 mm/s or more, and even more preferably 5 mm/s or more.

The relative moving speed V2 in the plane direction may not be particularly limited provided that the nozzle 21 can be operated. However, from a practical viewpoint, the relative moving speed V2 in the plane direction can be preferably 9 000 mm/s or less, more preferably 1 000 mm/s or less, and even more preferably 250 mm/s or less.

The relative moving speed V2 can be suitably changed by changing the driving speed of the above-described position adjustment part 50, for example.

In this specification, the relative moving speed V2 can be represented by an absolute value.

From the viewpoint of improving production capacity, a supply amount M1 of the composition L in the forming step can be preferably 0.05 $mm^3$/s or more, more preferably 0.1 $mm^3$/s or more, and even more preferably 0.4 $mm^3$/s or more.

The supply amount M1 of the composition L in the forming step may not be particularly limited provided that the nozzle can be operated. However, from the viewpoint of stably forming a high precision deposit by keeping a balance between the supply amount M1 of the composition L and the relative moving speed of the nozzle, the supply amount M1 of the composition L can be preferably 150 $mm^3$/s or less, more preferably 50 $mm^3$/s or less, and even more preferably 15 $mm^3$/s or less.

In the case where the above-described dispenser is used as the liquid feeding part 25 of the supply part 20, for example, the supply amount M1 can be suitably changed by suitably adjusting the rotational speed of the rotor or by adjusting the shape or the inner diameter of the nozzle 21 or the viscosity of the composition L, for example.

Lastly, the supply of the composition L from the nozzle 21 can be stopped. With the above-mentioned steps, the deposit S having a predetermined shape can be formed on the object 70. Therefore, a deposit S formed by using a cosmetic slurry, for example, can make a three-dimensional object formed by linear bodies containing cosmetics derived from the composition. The nozzle 21 may be moved relative to the object 70 on the same plane, or may be separated relative to the object 70 if desired.

Figure 3C:
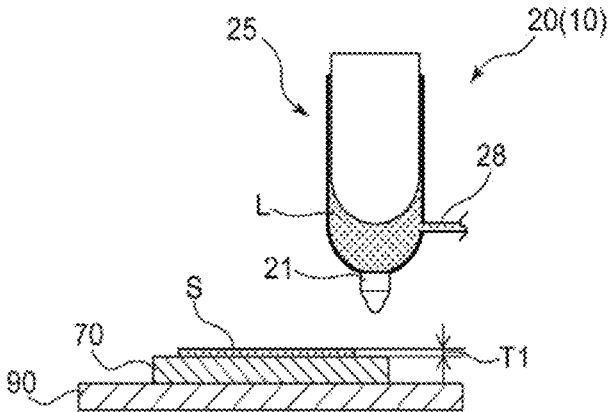

One example of such operations is shown in FIG. 3C.

The deposit S formed and shaped as described above may be directly used as a target personal care product, or may be used as a target personal care product after one or more additional steps are further performed. In either case, with the production method according to one or more embodiments of the present disclosure, it may be unnecessary to use a form or the like and a desired design can be drawn with high accuracy and high precision by changing the formulation of the composition and hence, it can be possible to perform shaping and decoration easily and efficiently with excellent shape accuracy and excellent dimensional accuracy.

A deposit having the following line width may also be referred to or regarded as "linear body."

A line width W1, as viewed in a plan view, of the deposit S (linear body) produced by the method described above may not be particularly limited. However, from the viewpoint of forming a high precision three-dimensional design, the line width W1 can be preferably 0.05 mm or more, more preferably 0.1 mm or more, and even more preferably 0.15 mm or more.

From the viewpoint of forming a high precision design, the line width W1, as viewed in a plan view, of the deposit S (linear body) can be preferably 1 mm or less, more preferably 0.7 mm or less, even more preferably 0.5 mm or less, and further preferably 0.4 mm or less.

The line width W1, as viewed in a plan view, of the deposit S can be suitably changed by setting, for example, the distance H1 between the tip of the nozzle 21 and the object 70 to a value which falls within the above-described ranges, or by adjusting the shape or the inner diameter of the nozzle 21 or the formulation or the viscosity of the composition L, for example.

From the viewpoint of forming a three-dimensional design, a thickness (a length along the direction orthogonal to the surface of the object 70) T1 of the deposit S (linear body) produced by the method described above can be preferably 0.05 mm or more, more preferably 0.1 mm or more, and even more preferably 0.15 mm or more.

The thickness T1 of the deposit S (linear body) may not be particularly limited. However, from the viewpoint of suppressing collapse of a deposit having one layer during formation of the deposit, the thickness T1 of the deposit S can be preferably 1 mm or less, more preferably 0.5 mm or less, and even more preferably 0.3 mm or less.

Note that when a deposit (linear body) has only one layer, the thickness T1 can indicate the thickness of the one layer, and when a plurality of deposits (linear bodies) are laminated, the thickness T1 can indicate the thickness of each layer in units of single layers.

The thickness T1 of the deposit S can be suitably changed by setting, for example, the distance H1 between the tip of the nozzle 21 and the object 70 to a value which falls within the above-described ranges, or by adjusting the shape or the inner diameter of the nozzle 21 or the formulation or the viscosity of the composition L, for example.

After the forming step is performed, it may be preferable to perform a step in which the composition L present on the object 70 is solidified to make the deposit S (solidifying step). By performing such a step, formability of the deposit S can be increased and impact resistance during distribution and use can be improved and, in addition to the above, it can also be possible to increase feeling of use of a product. It may be sufficient to perform the solidifying step as follows. For example, a liquid removal method under non-heated conditions, such as air drying or removal in vacuum, a liquid removal method under heated conditions, such as hot air drying, or a solidification method, such as cooling, can be adopted to remove a slurry-based liquid from the composition L or to solidify the slurry-based liquid, thus making a solidified deposit S.

Also in the case where the solidifying step is performed, it may be preferable that the thickness T1 of the formed deposit S satisfies the above-described ranges. To set the thickness T1 to a value which falls within the above-described ranges, it can be sufficient to adjust the content of powder in a cosmetic slurry, for example.

From the viewpoint of producing personal care products containing powder as a main ingredient, such as powder cosmetic products, the above-described deposit (linear body) derived from the composition contains, as the solid content of the deposit, can be preferably 70 mass % or more, more preferably 80 mass % or more, and even more preferably 85 mass % or more of powder.

From the viewpoint of formability, it may be preferable that the deposit (linear body) derived from the composition contain, as the solid content of the deposit, is 99 mass % or less of powder.

To cause the deposit to have such a formulation, for example, the composition L can be caused to contain powder within the above-described ranges of the solid content, or the composition L containing a liquid medium and powder can be supplied onto the object 70 and, thereafter, the solidifying step can be performed to remove the liquid medium, for example. With such an operation, it may be possible to achieve the deposit having such a formulation.

In the production method of one or more embodiments of the present disclosure, the above-described forming step may be performed only one time according to a design provided to a target personal care product. Alternatively, the above-described forming step may be performed a plurality of times to form a plurality of deposits S on the same plane, or to laminate a plurality of deposits S, thus making a three-dimensional shape. That is, after a first forming step is performed to form a first deposit, a forming step including a second forming step may be further performed one or more times to form one or more deposits other than the first deposit. In this case, the deposits other than the first deposit may be formed on the object 70 separately and independently from the first deposit, may be formed to be laminated onto a first deposit S1, or may be formed to form a combination of the above.

Figure 4A:
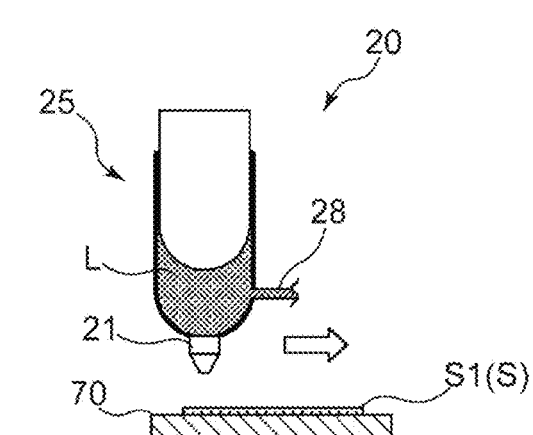
FIG. 4A and FIG. 4B are cross-sectional views schematically showing another embodiment of the step of forming a deposit by the production method of the present disclosure.

To be more specific, in an example where a deposit other than a first deposit is laminated onto the first deposit, the first forming step can be performed to form a first deposit S1 on the object 70. Thereafter, the nozzle 21 can be moved relative to the object 70 on the same plane with supply of the composition L from the nozzle 21 stopped (moving step). By performing the moving step, the position of the nozzle 21 can be rearranged at a position at which supply of the composition L to the object 70 is started. One example of this embodiment is shown in FIG. 4A.

Figure 4B:
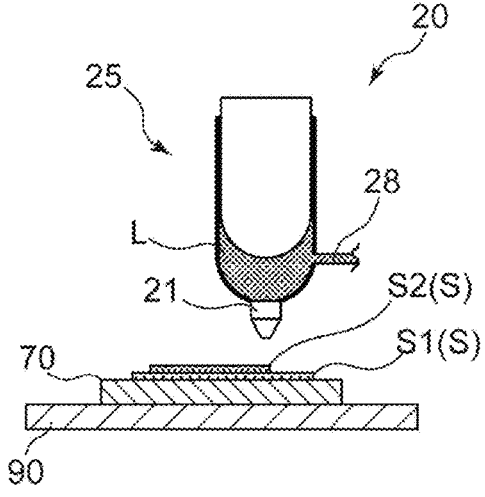

Then, the second forming step can be further performed by restarting the supply of the composition L from the nozzle 21, thus forming a second deposit S2, being a deposit S other than the first deposit S1, on the object 70. One example of this embodiment is shown in FIG. 4B.

Figure 5A:
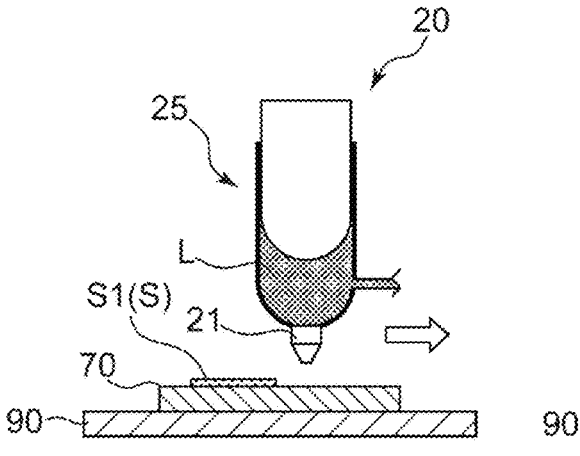
FIG. 5A and FIG. 5B are cross-sectional views schematically showing still another embodiment of the step of forming a deposit by the production method of the present disclosure.

In an example where a deposit other than a first deposit is formed separately and independently from the first deposit, the first forming step can be performed to form a first deposit S1 on the object 70. Thereafter, the moving step can be performed. One example of this embodiment is shown in FIG. 5A.

Figure 5B:
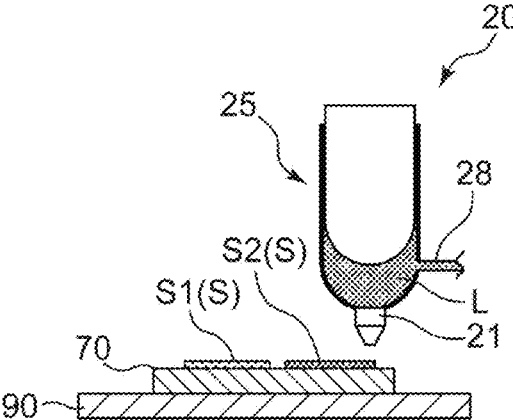

Then, the second forming step can be further performed by restarting the supply of the composition L from the nozzle 21, thus forming a second deposit S2, being a deposit S other than the first deposit S1, on the first deposit S1. One example of this embodiment is shown in FIG. 5B.

In either embodiment described above, by repeatedly performing the forming step and the moving step in this order, it can be possible to form, on at least one of either the object 70 or the first deposit S1, one or more deposits other than the deposit S that is already formed.

The compositions L used in forming the respective deposits S may have the identical formulation or may have different formulations.

After each deposit S is formed, the solidifying step may be performed, if desired. The solidifying step may be performed each time the deposit S is formed, that is, may be performed a plurality of times, or may be performed after all target deposits S are formed.

In the production method according to one or more embodiments of the present disclosure, the forming step may be performed a plurality of times to produce a personal care product, being a three-dimensional structure having a predetermined design.

Figure 6A:
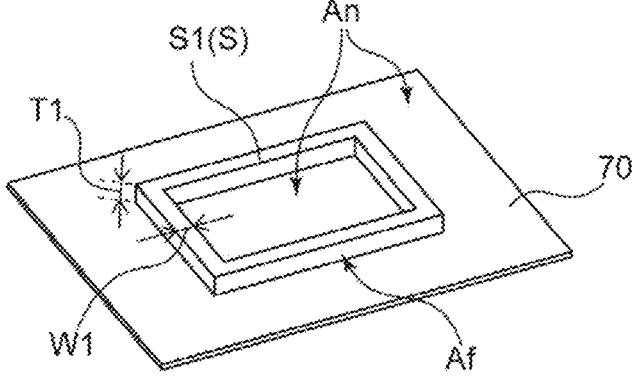
FIG. 6A to FIG. 6C are perspective views schematically showing still another embodiment of the step of forming a deposit by the production method of the present disclosure.

First, it may be preferable that the first forming step be performed to form a first deposit S1 on the object 70. At this point of operation, it may also be preferable to perform the first forming step such that a deposition region Af, in which the deposit S is present on the object 70, and a non-deposition region An, in which no deposit S is present on the object 70, are formed when the object 70 is viewed in a plan view. That is, the first deposit S1 formed in this step can be present at a portion of the region of the object 70, and a region where the first deposit S1 is present can be same as the deposition region Af. The non-deposition region An can be regarded as a region where the surface of the object 70 is exposed. One example of this embodiment is shown in FIG. 6A.

The first deposit S1 may be formed as a three-dimensional shaped body being a linear body containing cosmetics. It may be preferable that the three-dimensional shaped body be formed by a laminated structure in which a plurality of linear bodies are laminated.

According to one or more embodiments, the non-deposition regions An can be separated by the deposition region Af as viewed in a plan view, thus being formed in a region surrounded by the deposition region Af as viewed in a plan view and in a region outside the deposition region Af as viewed in a plan view.

Figure 6B:
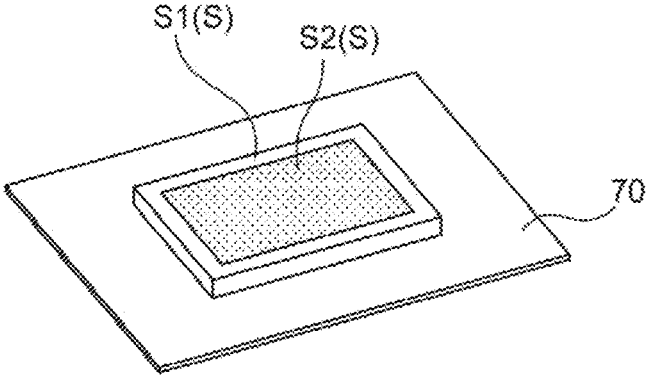

Subsequently, it can be preferable that the second forming step be performed to form a second deposit S2 in the non-deposition region An. At this point of operation, in the second forming step, the second deposit S2 can be formed by supplying a composition L same as or different from the composition L supplied in the first forming step. One example of this embodiment is shown in FIG. 6B.

It may be preferable, according to one or more embodiments of the present disclosure, that the second deposit S2 be formed in the entire non-deposition region An surrounded by the deposition region Af as viewed in a plan view.

In addition to the above, a third forming step may be further performed if desired. In the case where the third forming step is performed, for example, a third deposit S3 can be formed by laminating the third deposit S3 onto either one of or both of the first deposit S1 and the second deposit S2. At this point of operation, for a composition L supplied in the third forming step, it can be possible to use a composition same as or different from the composition L supplied in the first forming step or the second forming step.

A third deposit S3 may be formed on at least a portion of the first deposit S1, and may also be formed on at least a portion of the second deposit S2.

Figure 6C:
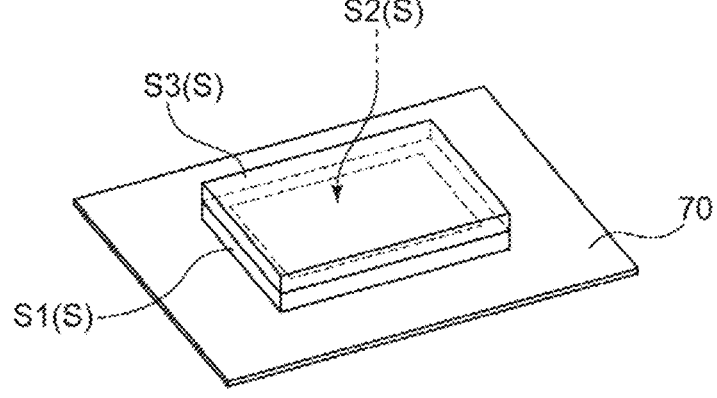

The third deposit S3 may be continuously formed on the entire region of the first deposit S1 and the entire region of the second deposit S2. With such operations, a three-dimensional structure including a plurality of layers can be formed. One example of this embodiment is shown in FIG. 6C.

It may be preferable that a different design be visually recognized in each layer of the three-dimensional structure.

As described above, the compositions L used to form the respective deposits S1, S2, S3 may have the identical formulation or different formulations. In either case, it may be preferable that each composition L contain at least cosmetics.

From the viewpoint of allowing consumers to visually recognize the design of the three-dimensional structure for an image of a beautiful appearance, it may be preferable that the first deposit S1 be colored (including being transparent or opaque) or transparent (including being colored or colorless).

From the same viewpoint, it may be preferable that the second deposit S2 be colored (including being transparent or opaque) or transparent (including being colored or colorless), and it is also preferable that the second deposit S2 have a color different from the color of the first deposit S1 or be transparent. The third deposit S3 may be colored (including being transparent or opaque) or transparent (including being colored or colorless) according to a target product. With such a configuration, the three-dimensional structure formed by the respective deposits can have a predetermined design that can be visually recognized.

To form deposits having different visually recognizable colors, the presence or absence or the kind of pigment in the compositions L may be suitably adjusted. With such an operation, it can be possible to easily obtain the deposits having different visually recognizable colors.

In the above description, the description has been made by taking, as an example, the case where a cosmetic slurry is used as the composition L. However, the production method according to one or more embodiments of the present disclosure can also be applicable to a case where a fluid composition other than a slurry is used.

In the case where a solution containing liquid and cosmetics is used as a composition L, for example, it can be sufficient to supply the solution onto an object 70 and, thereafter, remove a solvent from the solution, being the composition L on the object 70, by a method, such as pressure reduction, to solidify the cosmetic in the composition L by precipitation, thus making a deposit S.

Further, in the case where a heated melt or an emulsion containing cosmetics is used as a composition L, for example, it can be sufficient to supply the melt onto an object 70 and, thereafter, to cool the composition L on the object 70 to solidify the melt, for example. In the case where a melt or an emulsion is used, it can be possible to use a melt or an emulsion that is in a liquid state at least when the melt or the emulsion is discharged from the nozzle 21. The purpose of cooling can be to reduce the temperature of a filler filled into a container to a temperature lower than the temperature of a discharged fluid. Cooling can also include refrigerating or freezing in addition to modes in which the temperature of an object in a heated state is reduced to an ambient temperature, for example.

For example, in the case of the embodiment shown in FIG. 6A to FIG. 6C, it can be sufficient to form the linear body, being the first deposit S1, by using, as a first composition L, a slurry containing liquid and solid cosmetic powder and, thereafter, to form the second deposit S2 or the third deposit S3 by using, as a second composition L, a heated melt or an emulsion containing cosmetics and oil agents.

With the above-mentioned production method, it can be possible to obtain a personal care product including the deposits.

For example, if the object 70 is a personal care product, the deposits can be directly formed on the personal care product and a design formed by the deposits can be visually recognizable and hence, it can be possible to achieve a personal care product with high designability. A variety of designs can be easily drawn and formed. Further, a formed deposit can be a high precision three-dimensional deposit and hence, it can also be possible to achieve a visually recognized design with excellent designability. After a personal care product is decorated by laminating a deposit, which can be separately formed and shaped, onto the personal care product, or a packaging step is performed in which the personal care product is accommodated in a packaging bag or a packaging box, if desired, the personal care product can be distributed in the market.

In one embodiment of a personal care product including a deposit, the personal care product can include, as the deposit, a three-dimensional shaped body formed by linear bodies containing cosmetics. The three-dimensional shaped body may be formed as a laminated structure in which a plurality of linear bodies serving as deposits are laminated, for example.

In this case, the thickness of the linear body may be set to a value which falls within the same range as the above-described thickness T1, and the line width of the linear body may be set to a value which falls within the same range as the above-described line width W1.

The above-described linear body can be the deposit and hence, it may be preferable that the linear body contains powder as a solid content with the content described above.

A personal care product may be formed such that the second deposit S2, which can be a composition containing cosmetics, can be further disposed in the entire region surrounded by a three-dimensional shaped body formed by a linear body, which can be the first deposit S1. The composition used for forming the second deposit S2 can have a formulation same as or different from the formulation of the composition used for forming the linear body.

A personal care product may be configured to have a plurality of layers, and a different design may be visually recognized in some or all of the layers.

A personal care product may be configured such that the first deposit S1 being a linear body can be colored, and the second deposit S2 that can be present in the region surrounded by the linear body can be transparent. Such a configuration can form a predetermined design that can be visually recognized. Alternatively, a personal care product may be formed such that the first deposit S1 is transparent and the second deposit S2 is colored.

Matters applicable to the above-described production method will be described hereinafter. Unless otherwise specified, the states (three states) of a substance described below are presumed to be based on one atmosphere and 20° C.

From the viewpoint of stabilizing quality by improving uniform dispersibility of a material contained in the composition or of stabilizing a shape by suppressing collapse of a deposit discharged from the nozzle, the viscosity of the composition L used according to one or more embodiments of the present disclosure can be preferably 0.1 Pa·s or more, more preferably 0.5 Pa·s or more, and even more preferably 1 Pa·s or more.

From the viewpoint of improving formability by improving dischargeability, the above-mentioned viscosity can be preferably 1 000 Pas or less, more preferably 500 Pa·s or less, and even more preferably 200 Pa·s or less.

The viscosity of the above-described composition can be measured after the temperature of the composition is set to a temperature the same as the temperature of the composition at the time of being supplied from the nozzle 21, that is, to a temperature of the composition at the time of being discharged. In the case where a composition is other than a heated melt, such as the case where the composition is a slurry, for example, and the composition is supplied from the nozzle at a room temperature (25° C.), the viscosity of the above-described composition can be a value obtained by measuring the viscosity of the composition at 25° C. by using a B-type viscometer (digital viscometer TVB-10R made by Toki Sangyo Co., Ltd). Conditions for measurement in this case can be as follows. Any one of rotors No. M1, M2, M3, M4, H1, H2, H3, H4, H5, H6, H7, T-A, T-B, T-C, T-D and T-E can be used as the rotor according to the viscosity range of a sample, the rotational speed can be set to 3 to 100 rpm, and a measurement time period can be set to 60 seconds. In the case where the composition is a heated melt, viscosity can be measured under the conditions for measurement described above after the temperature of the composition is set to a temperature equal to the temperature of the composition at the time of being supplied from the nozzle 21.

It is preferable that the composition L used according to one or more embodiments of the present disclosure can contain one or two or more selected from an oil agent and a solid, such as a powder.

It may be preferable that examples of such a solid can include powders used as normal cosmetic ingredients, such as a color pigment and an extender pigment.

Examples of the color pigment and the extender pigment can include an inorganic powder, an organic powder, and a composite powder of an inorganic powder and an organic powder.

Examples of the inorganic powder can include a silicic acid, a silicic anhydride, a magnesium silicate, talc, sericite, mica, kaolin, red iron oxide, clay, bentonite, mica, mica coated by titanium, bismuth oxychloride, zirconium oxide, magnesium oxide, titanium oxide, zinc oxide, aluminum oxide, calcium sulfate, barium sulfate, magnesium sulfate, calcium carbonate, magnesium carbonate, iron oxide, ultramarine, chromium oxide, chromium hydroxide, calamine, carbon black, boron nitride, and complexes of the above.

Examples of the organic powder can include polyamide, nylon, polyester, polypropylene, polystyrene, polyurethane, a vinyl resin, a urea resin, a phenol resin, a fluororesin, a silicone resin, an acrylic resin, a melamine resin, an epoxy resin, a polycarbonate resin, a divinylbenzene-styrene copolymer, a silk powder, cellulose, a metal salt of long-chain alkyl phosphate, an N-mono long-chain alkyl acyl basic amino acid, and complexes of the above.

These extender pigments or color pigments can be colored or non-colored (white or essentially transparent, for example), and can provide, to the composition or the skin, one or more advantageous effects selected from coloring, diffraction of light, absorption of oil, translucency, opacity, glossiness, an external appearance with no glossiness, smoothness, and the like.

Although the content of powder in the composition can vary depending on the purpose, from the viewpoint of productivity in terms of drying, the content of powder in the composition can be preferably 20 mass % or more, more preferably 30 mass % or more, and even more preferably 40 mass % or more.

From the viewpoint of productivity in terms of fluidity during supply of the composition, the content of powder in the composition can be preferably 85 mass % or less, more preferably 80 mass % or less, and even more preferably 70 mass % or less.

By setting the content of powder in the composition to a value which falls within these ranges, it can be possible to easily produce a personal care product having a high precision three-dimensional shape, and it can also be possible to increase excellent feeling of use during the use of the product.

From the viewpoint of adjusting tinting strength or optical properties, such as brightness and saturation, the average particle size of a powder in the composition can be preferably 0.1 μm or more, and more preferably 1 μm or more.

From the viewpoint of suppressing nozzle clogging to allow continuous stable discharge, the average particle size of a powder in the composition can be preferably 300 μm or less, more preferably 150 μm or less, and even more preferably 100 μm or less.

A volume cumulative particle size D50 in a cumulative volume of 50 volume % measured by a laser diffraction/scattering particle size distribution measurement device can be taken as an average particle size. In the case where the average particle size of powder is measured from a final product, first, the product can be dissolved in water or oil to dissolve a binder ingredient, thus dispersing particles in a solvent. Thereafter, distribution of the particle size of solids can be measured by using a particle size distribution meter, and a volume cumulative particle size D50, being the obtained result, can be taken as the average particle size.

From the viewpoint of stable supply from the nozzle, it can be preferable that the average particle size of powder in the composition is smaller than the nozzle diameter D1.

From the viewpoint of reducing the line width W1, as viewed in a plan view, of a deposit S (linear body) produced by the method described above and of stably forming a high precision three-dimensional design, the ratio of the average particle size of powder in the composition to the nozzle diameter D1 (average particle size/nozzle diameter) can be preferably 1 or less, more preferably 0.5 or less, even more preferably 0.35 or less, and further preferably 0.3 or less.

Although a smaller average particle size/nozzle diameter may be more preferable, a practical average particle size/nozzle diameter can be 0.001 or more.

Examples of the oil agent that may be contained in the fluid include one or two or more selected from oils being liquid at one atmosphere and 20° C. (hereinafter also referred to as "liquid oil") and oils being solid at one atmosphere and 20° C. (hereinafter also referred to as "solid oil").

Examples of the liquid oil can include a straight-chain or branched hydrocarbon oil, a vegetable oil, an animal oil, an ester oil, a silicone oil, and a polymer alcohol.

Examples of the straight-chain or branched hydrocarbon oil can include liquid paraffin and squalene.

Examples of the vegetable oil can include jojoba oil and olive oil.

Examples of the animal oil can include liquid lanolin and the like.

Examples of the ester oil include a monoalcohol fatty acid ester and a polyhydric alcohol fatty acid ester.

Examples of the silicone oil can include dimethylpolysiloxane, dimethylcyclopolysiloxane, methylphenylpolysiloxane, methylhydrogenpolysiloxane, and a higher-alcohol-modified organopolysiloxane.

Examples of the polymer alcohol can include polyethylene glycol.

Examples of the solid oil can include petrolatum, cetanol, stearyl alcohol, and ceride.

Although the content of oil agent in the composition can vary depending on the purpose, the content of oil agent in the composition can be, as a total amount, preferably 0.5 mass % or more, more preferably 1 mass % or more, and even more preferably 1.5 mass % or more.

The content of oil agent in the composition can be preferably 30 mass % or less, more preferably 20 mass % or less, and even more preferably 15 mass % or less.

By setting the content of oil agent in the composition to a value which falls within these ranges, it can be possible to increase excellent color development or feeling of a personal care product.

According to a kind of a target personal care product, the composition may suitably contain, at a level that does not impair advantageous effects of one or more embodiments of the present disclosure, one or two or more ingredients selected from a thickener, a film-forming agent, a surfactant, a sugar, a polyhydric alcohol, a water-soluble polymer, a sequestering agent, a lower alcohol, an amino acid, an organic amine, a pH adjuster, a skin conditioning agent, a vitamin, an antioxidant, a fragrance, a preservative, an ultraviolet absorber, and an ultraviolet scattering agent, for example.

Examples of the ultraviolet absorber can include one two or more selected from a benzophenone derivative and a methoxycinnamic acid derivative.

Examples of the benzophenone derivative can include dihydroxybenzophenone, dihydroxydimethoxybenzophenone, hydroxy-methoxybenzophenonesulphonate, and dihydroxydimethoxybenzophenone disulfonate.

Examples of the methoxycinnamic acid derivative can include methoxycinnamate-2-ethylhexyl and the like.

Fine particles having an average particle size of 0.1 μm or less may be used as the ultraviolet scattering agent, for example.

Examples of the ultraviolet scattering agent can include one or two or more selected from zinc oxide, titanium oxide, silica and the like.

It may also be preferable that the composition L can further contain a liquid medium. The liquid medium can be regarded as a liquid capable of being used as a solvent or a dispersion medium that dissolves or disperses cosmetics. In the case where the composition L is in the form of slurry, it may be preferable that the composition L is a mixture containing at least powder and liquid medium. In the case where the composition L is in the form of cosmetic slurry, it may be preferable that the composition L is a mixture containing at least an oil agent, a liquid medium, and a powder containing the above-described pigment.

An example of the above-described liquid (liquid medium) can include a substance (volatile solvent) having volatility in a liquid state. Specifically, examples of the liquid (liquid medium) can preferably include one or two or more selected from water, an alcohol, a ketone, and a hydrocarbon.

For example, a monovalent chain aliphatic alcohol with 1 to 6 carbon atoms, a monovalent cyclic aliphatic alcohol with 3 to 6 carbon atoms, or a monovalent aromatic alcohol can be preferably used as the alcohol. Specific examples of the above can include ethanol, isopropyl alcohol, butyl alcohol, phenylethyl alcohol, propanol, and pentanol.

For example, a chain aliphatic ketone with 3 to 6 carbon atoms, a cyclic aliphatic ketone with 3 to 6 carbon atoms, or an aromatic ketone with 8 to 10 carbon atoms can be preferably used as the ketone. Specific examples of the above can include acetone, methyl ethyl ketone, methyl isobutyl ketone, cyclohexanone, and acetophenone.

For example, an isoparaffinic hydrocarbon can be preferably used as the hydrocarbon, and the specific example of the isoparaffinic hydrocarbon can include an IP solvent.

In the case where the composition L contains a liquid medium, although the content of liquid medium in the composition can vary depending on the purpose, the content of liquid medium in the composition can be, as a total amount, preferably 20 mass % or more, more preferably 30 mass % or more, and even more preferably 40 mass % or more.

The content of liquid medium in the composition can be preferably 70 mass % or less, more preferably 60 mass % or less, and even more preferably 50 mass % or less.

By setting the content of liquid medium in the composition to a value which falls within these ranges, it can be possible to increase uniform dispersibility of constituent materials of the composition L and ease of handling of the composition L.

In the case where an aroma candle is produced by one or more embodiments of the present disclosure, a whole or a part of the aroma candle can be preferably formed from the deposit S.

EXAMPLE

Hereinafter, one or more embodiments of the present disclosure will be described in further detail with reference to examples. However, the scope of the present disclosure is not limited by the examples.

Examples 1-1 to 1-8 and Comparison Examples 1-1 to 1-2

Materials described below were mixed, and a cosmetic slurry containing cosmetics and water serving as a liquid medium was used as a composition L. The proportion of powder with respect to the total of the composition L was 47.9 mass %. The density of the composition L was 1.53 g/cm$^3$.

<Formulation of Composition L>

(1) Powder Ingredient

Pearl powder: 52 parts by mass

Pigment powder: 38.95 parts by mass (2) Ingredients Other than Powder

Water: 90 parts by mass

Oil agent: 3 parts by mass

Wetting agent: 2 parts by mass

Thickener: 0.55 parts by mass

Preservative and others: 3.5 parts by mass

Next, a forming step was performed in which a solid cosmetic (foundation), being one kind of personal care products, was used as the object 70, and the above-described composition L was continuously supplied onto the object 70. Thereafter, a solidifying step was performed by drying the composition L to remove composition-based water from the composition L on the object 70. A deposit S formed by a plurality of linear bodies having a straight line shape was formed on the object 70 in this manner. Makeup cosmetic products of examples 1-1 to 1-8 were obtained in this manner. The proportion of powder in the deposit S was 91.0 mass %.

The forming step was performed by moving the nozzle 21 by a predetermined distance with the object 70 fixed under the condition that the temperature of the composition L during supply of the composition L (temperature of the composition L during discharge of the composition L) was set to a constant temperature of 23° C. A viscosity at 23° C. was 53.7 Pa·s. Other conditions in the forming step are as shown in the following Table 1.

Examples 2-1 to 2-7 and Comparison Example 2-1

A plurality of linear bodies were formed on an object 70 to form a deposit S on the object 70 by a method substantially the same as the method adopted in the example 1-1 except for that the supply speed V1 and the supply amount M1 of the composition L and the relative moving speed V2 of the nozzle 21 relative to the object 70 in the plane direction were changed to constant conditions shown in the following Table 2.

Examples 3-1 to 3-7

A plurality of linear bodies were formed on an object 70 to form a deposit S on the object 70 by a method substantially the same as the method adopted in the example 1-1 except for that the distance H1 from the nozzle 21 to the object 70 and the supply speed V1 and the supply amount M1 of the composition L were set to constant values under conditions shown in the following Table 3, and the relative moving speed V2 of the nozzle 21 relative to the object 70 in the plane direction was changed to conditions shown in the following Table 2.

[Measurement of Line Width W1 and Thickness T1 of Deposit]

The line width W1 and the thickness T1 of the linear deposit formed in each example and each comparison example were measured by the following method. The shape of the deposit was measured by using a noncontact 3D shape measuring machine (VR-3100 made by KEYENCE CORPORATION), the line width of the deposit was measured from a plan view of the obtained image, and the thickness of the deposit was measured from a height difference profile of the obtained image. An average value of line widths W1 measured at ten points was taken as line width W1, and an average value of thicknesses T1 measured at ten points was taken as thickness T1. The results are shown in the following Table 1 to Table 3.

[Evaluation of Ease of Drawing]

The linear deposit formed in each example and each comparison example was observed in a plan view, and was evaluated according to the following criteria.

Evaluation of ease of drawing is represented by grades A to F according to the following criteria, and grade A is the highest grade. A linear deposit having a higher grade means a linear deposit that allows shaping and decoration of a personal care product with higher shape accuracy and higher dimensional accuracy. The results are shown in the following Table 1 to Table 3.

<Evaluation Criterion of Ease of Drawing>

Figure 7:
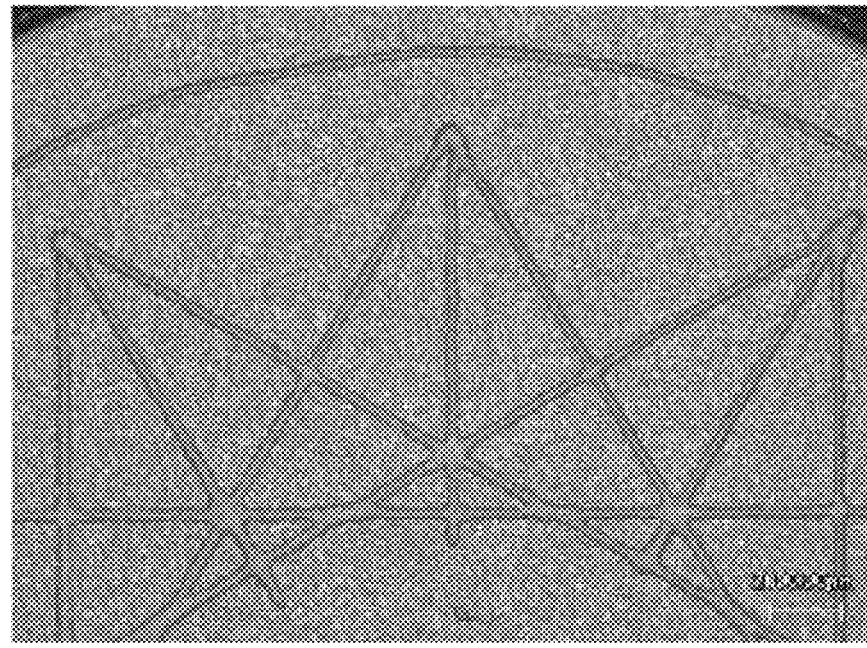
FIG. 7 is a top plan photograph of a personal care product on which a deposit is formed, the deposit having a grade of A in evaluation of ease of drawing in an example.

A: "(Line width W1/nozzle diameter D1)≤1.25" is established, so that a linear deposit is extremely excellent in accuracy of drawing a target shape with target dimensions. An example of a drawing having such evaluation is shown in FIG. 7.

Figure 8:
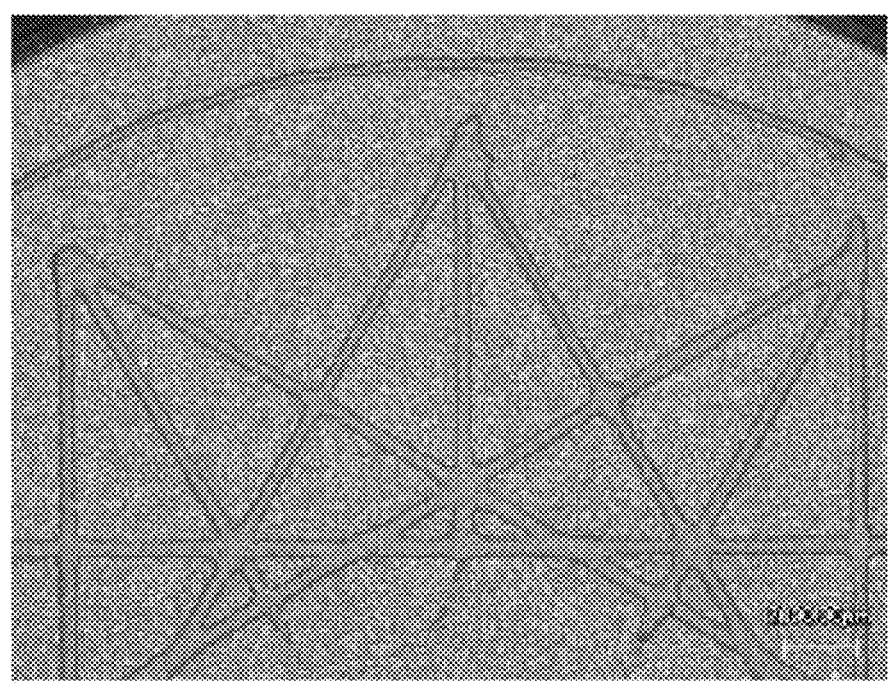
FIG. 8 is a top plan photograph of a personal care product on which a deposit is formed, the deposit having a grade of B in the evaluation of ease of drawing in the example.

B: "1.25<(line width W1/nozzle diameter D1)≤2" is established, so that a linear deposit has excellent accuracy of drawing a target shape with target dimensions. An example of a drawing having such evaluation is shown in FIG. 8.

Figure 9A:
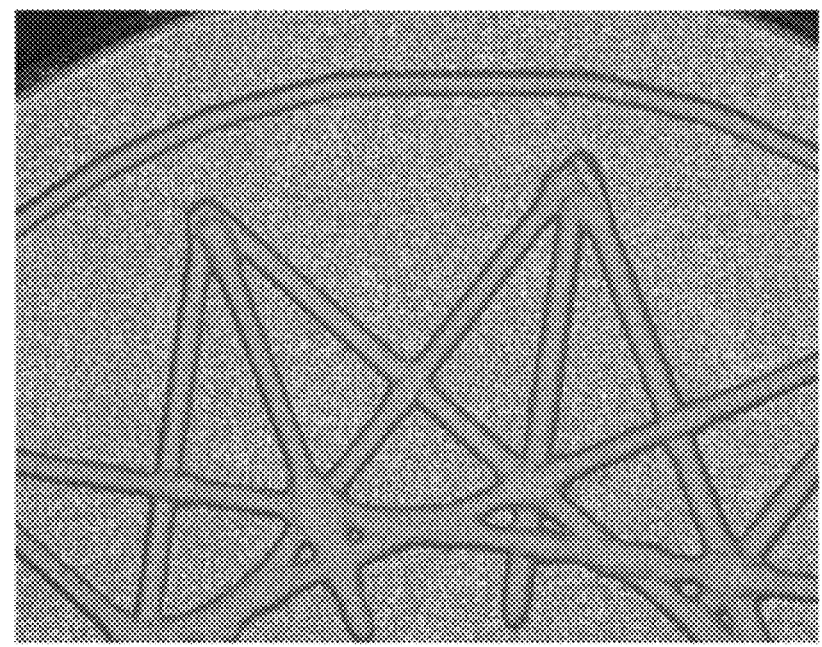
FIG. 9A and FIG. 9B are top plan photographs of a personal care product on which a deposit is formed, the deposit having a grade of C in the evaluation of ease of drawing in the example.
Figure 9B:
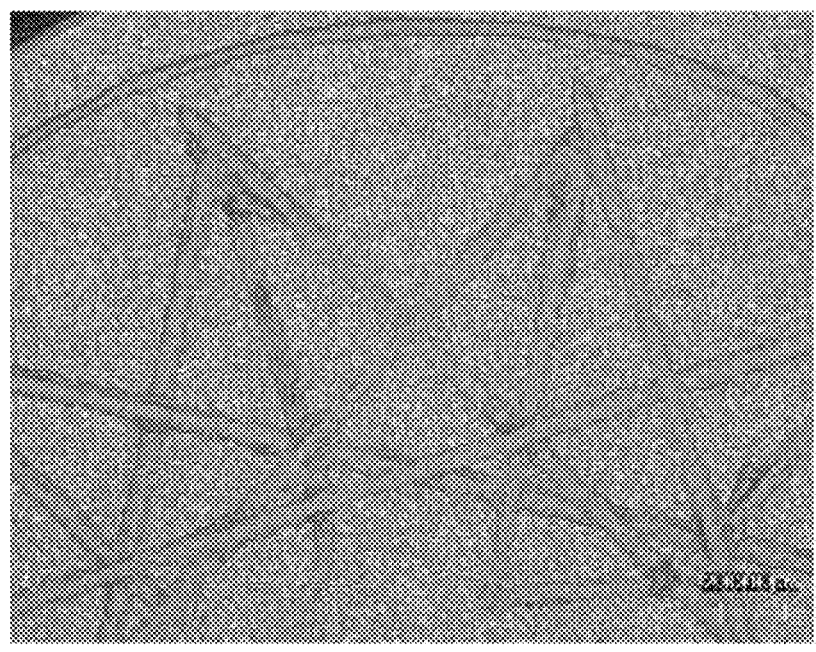

C: "(Line width W1/nozzle diameter D1)>2" is established, so that a linear deposit can be drawn with a continuous line having no chipping or voids, thus having ease of drawing with higher accuracy. An example of a drawing having such evaluation is shown in FIG. 9A and FIG. 9B.

Figure 10:
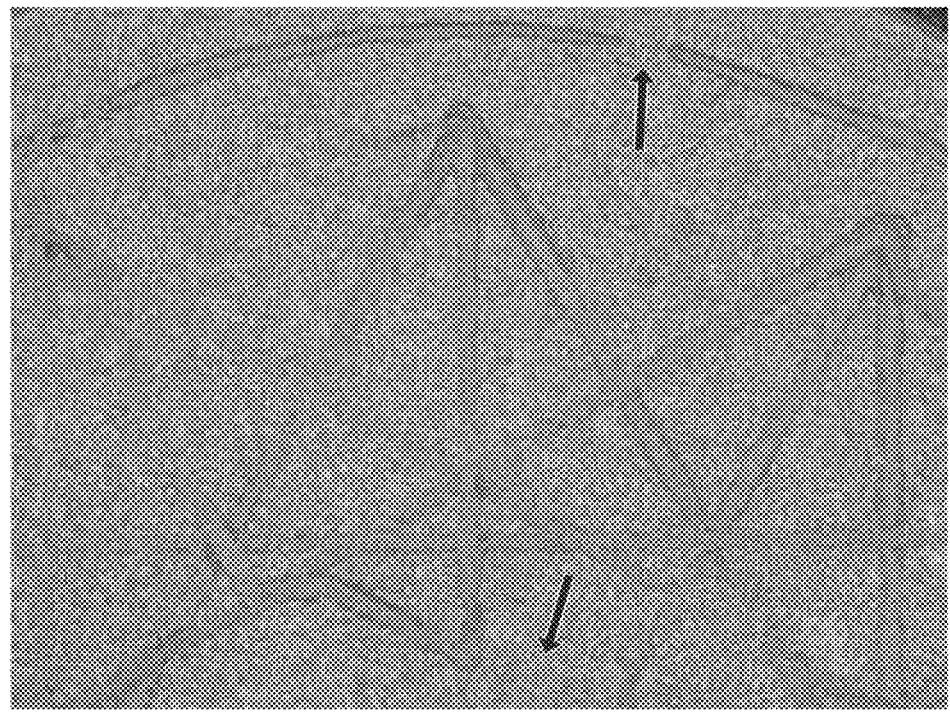
FIG. 10 is a top plan photograph of a personal care product on which a deposit is formed, the deposit having a grade of D in the evaluation of ease of drawing in the example.

D: A linear deposit has ease of drawing of a level that allows a target shape to be visually recognized macroscopically. Although chipping or voids can been seen in the linear deposit, these are of a level that will not be noticed by a user of the personal care product, thus having ease of drawing with high accuracy. An example of a drawing having such evaluation is shown in FIG. 10. In FIG. 10, positions shown by arrows are where the drawing has chipping or voids.

Figure 11:
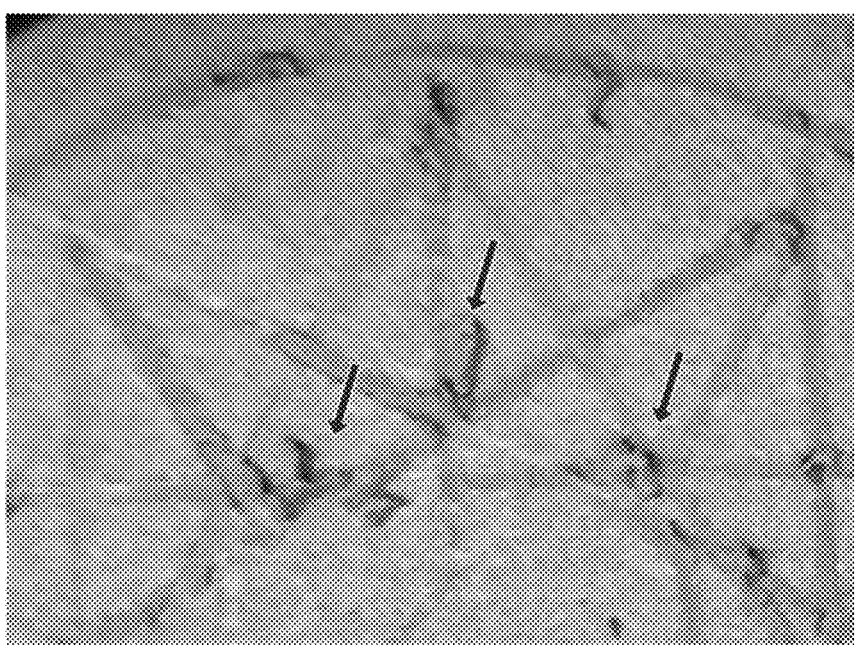
FIG. 11 is a top plan photograph of a personal care product on which a deposit is formed, the deposit having a grade of E in the evaluation of ease of drawing in the example.

E: A deposit or an object partially has chipping or separation due to contact between the tip of the nozzle and the object. An example of a drawing having such evaluation is shown in FIG. 11. In FIG. 11, positions shown by arrows are where the drawing has chipping or separation.

Figure 12A:
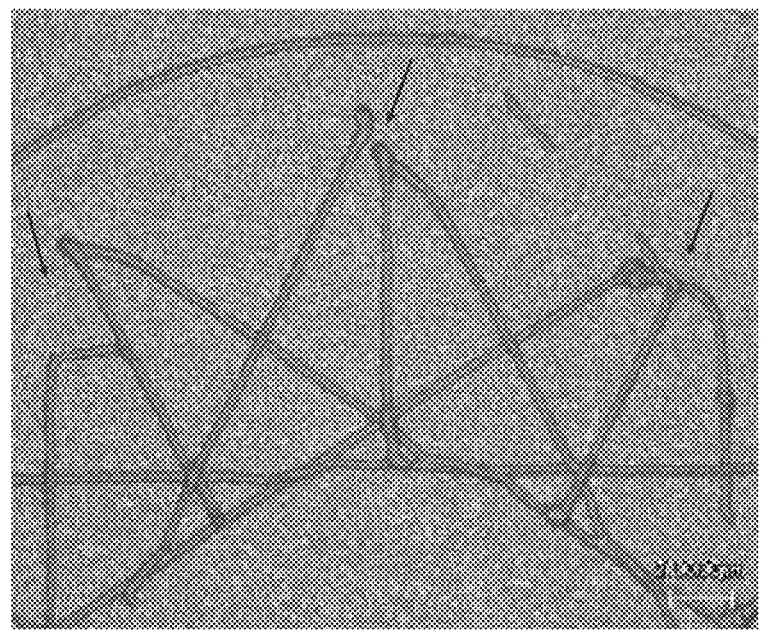
FIG. 12A and FIG. 12B is a top plan photograph of a personal care product on which a deposit is formed, the deposit having a grade of F in the evaluation of ease of drawing in the example.
Figure 12B:
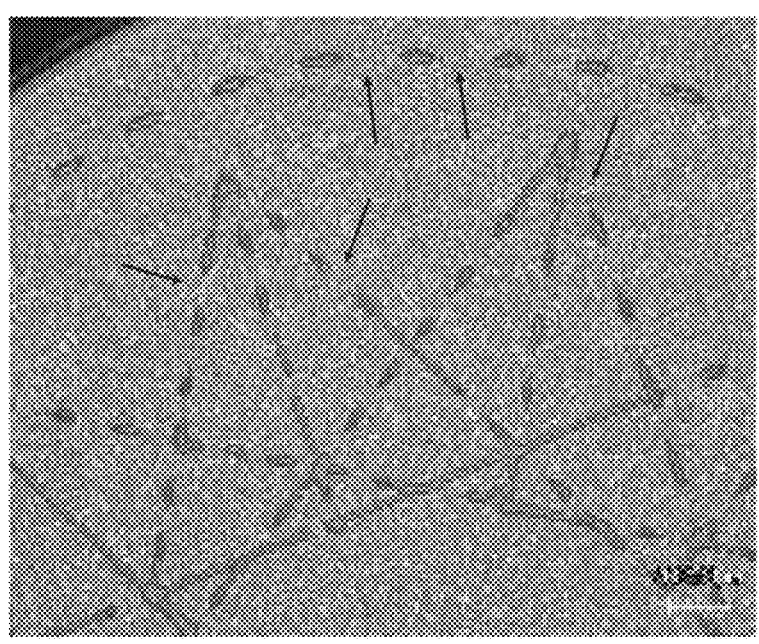

F: The line of a deposit unintentionally bends, the edge of the deposit is unclear, or the deposit forms a dotted line. An example of a drawing having such evaluation is shown in FIG. 12A and FIG. 12B. In FIG. 12A and FIG. 12B, positions shown by arrows are where the drawing is bent.

TABLE 1

| | | Comparison example 1-1 | Example 1-1 | Example 1-2 | Example 1-3 | Example 1-4 | Example 1-5 | Example 1-6 | Example 1-7 | Example 1-8 | Comparison example 1-2 |
|---|---|---|---|---|---|---|---|---|---|---|---|
| Conditions for production | Nozzle diameter D1 [mm] | 0.3 | 0.3 | 0.3 | 0.3 | 0.3 | 0.3 | 0.3 | 0.3 | 0.3 | 0.3 |
| | Distance H1 [mm] between tip of nozzle 21 and object 70 | 0.10 | 0.15 | 0.20 | 0.27 | 0.30 | 0.40 | 0.50 | 0.60 | 0.70 | 0.90 |
| | H1/D1 | 0.33 | 0.50 | 0.67 | 0.90 | 1.00 | 1.33 | 1.67 | 2.00 | 2.33 | 3.00 |
| | Average particle size [μm] of powder in composition | 16.4 | 16.4 | 16.4 | 16.4 | 16.4 | 16.4 | 16.4 | 16.4 | 16.4 | 16.4 |
| | Average particle size of powder in composition/D1 | 0.05 | 0.05 | 0.05 | 0.05 | 0.05 | 0.05 | 0.05 | 0.05 | 0.05 | 0.05 |
| | Supply amount M1 [mm³/s] of composition L | 0.92 | 0.92 | 0.92 | 0.92 | 0.92 | 0.92 | 0.92 | 0.92 | 0.92 | 0.92 |

TABLE 1-continued

| | | Comparison example 1-1 | Example 1-1 | Example 1-2 | Example 1-3 | Example 1-4 | Example 1-5 | Example 1-6 | Example 1-7 | Example 1-8 | Comparison example 1-2 |
|---|---|---|---|---|---|---|---|---|---|---|---|
| | Supply speed V1 [mm/s] of composition L from nozzle | 13 | 13 | 13 | 13 | 13 | 13 | 13 | 13 | 13 | 13 |
| | Relative moving speed V2 [mm/s] of nozzle 21 relative to object in plane direction | 12 | 12 | 12 | 12 | 12 | 12 | 12 | 12 | 12 | 12 |
| | V2/V1 | 0.93 | 0.93 | 0.93 | 0.93 | 0.93 | 0.93 | 0.93 | 0.93 | 0.93 | 0.93 |
| Evaluation of deposit (linear body) | Line width W1 [mm] | 0.65 | 0.48 | 0.42 | 0.36 | 0.31 | 0.31 | 0.29 | 0.28 | 0.28 | 0.30 |
| | Thickness T1 [mm] | 0.08 | 0.05 | 0.17 | 0.22 | 0.25 | 0.25 | 0.25 | 0.27 | 0.24 | 0.26 |
| | W1/D1 | 2.15 | 1.59 | 1.39 | 1.21 | 1.02 | 1.03 | 0.96 | 0.94 | 0.94 | 0.99 |
| | Evaluation of ease of drawing | E | D | B | A | A | A | A | A | D | F |

TABLE 2

| | | Example 2-1 | Example 2-2 | Example 2-3 | Example 2-4 | Example 2-5 | Example 2-6 | Example 2-7 | Comparison example 2-1 |
|---|---|---|---|---|---|---|---|---|---|
| Conditions for production | Nozzle diameter D1 [mm] | 0.3 | 0.3 | 0.3 | 0.3 | 0.3 | 0.3 | 0.3 | 0.3 |
| | Distance H1 [mm] between tip of nozzle 21 and object 70 | 0.20 | 0.24 | 0.27 | 0.30 | 0.40 | 0.60 | 0.70 | 0.90 |
| | H1/D1 | 0.67 | 0.80 | 0.90 | 1.00 | 1.33 | 2.00 | 2.33 | 3.00 |
| | Average particle size [μm] of powder in composition | 16.4 | 16.4 | 16.4 | 16.4 | 16.4 | 16.4 | 16.4 | 16.4 |
| | Average particle size of powder in composition/D1 | 0.05 | 0.05 | 0.05 | 0.05 | 0.05 | 0.05 | 0.05 | 0.05 |
| | Supply amount M1 [mm³/s] of composition L | 1.38 | 1.38 | 1.38 | 1.38 | 1.38 | 1.38 | 1.38 | 1.38 |
| | Supply speed V1 [mm/s] of composition L from nozzle | 19.6 | 19.6 | 19.6 | 19.6 | 19.6 | 19.6 | 19.6 | 19.6 |
| | Relative moving speed V2 [mm/s] of nozzle 21 relative to object in plane direction | 18 | 18 | 18 | 18 | 18 | 18 | 18 | 18 |
| | V2/V1 | 0.92 | 0.92 | 0.92 | 0.92 | 0.92 | 0.92 | 0.92 | 0.92 |
| Evaluation of deposit (linear body) | Line width W1 [mm] | 0.51 | 0.57 | 0.43 | 0.37 | 0.27 | 0.26 | 0.27 | 0.27 |
| | Thickness T1 [mm] | 0.16 | 0.14 | 0.18 | 0.19 | 0.25 | 0.27 | 0.24 | 0.38 |
| | W1/D1 | 1.69 | 1.89 | 1.42 | 1.24 | 0.90 | 0.87 | 0.91 | 0.91 |
| | Evaluation of ease of drawing | B | B | B | A | A | A | D | F |

TABLE 3

| | | Example 3-1 | Example 3-2 | Example 3-3 | Example 3-4 | Example 3-5 | Example 3-6 | Example 3-7 | Example 3-8 |
|---|---|---|---|---|---|---|---|---|---|
| Conditions for production | Nozzle diameter D1 [mm] | 0.3 | 0.3 | 0.3 | 0.3 | 0.3 | 0.3 | 0.3 | 0.3 |
| | Distance H1 [mm] between tip of nozzle 21 and object 70 | 0.4 | 0.4 | 0.4 | 0.4 | 0.4 | 0.4 | 0.4 | 0.4 |
| | H1/D1 | 1.33 | 1.33 | 1.33 | 1.33 | 1.33 | 1.33 | 1.33 | 1.33 |
| | Average particle size [μm] of powder in composition | 16.4 | 16.4 | 16.4 | 16.4 | 16.4 | 16.4 | 16.4 | 16.4 |
| | Average particle size of powder in composition/D1 | 0.05 | 0.05 | 0.05 | 0.05 | 0.05 | 0.05 | 0.05 | 0.05 |
| | Supply amount M1 [mm³/s] of composition L | 0.92 | 0.92 | 0.92 | 0.92 | 0.92 | 0.92 | 0.92 | 0.92 |
| | Supply speed V1 [mm/s] of composition L from nozzle | 13 | 13 | 13 | 13 | 13 | 13 | 13 | 13 |
| | Relative moving speed V2 [mm/s] of nozzle 21 relative to object in plane direction | 3 | 6 | 9 | 12 | 13 | 15 | 18 | 21 |
| | V2/V1 | 0.23 | 0.46 | 0.69 | 0.93 | 1.00 | 1.16 | 1.39 | 1.62 |
| Evaluation of deposit (linear body) | Line width W1 [mm] | 0.75 | 0.51 | 0.36 | 0.31 | 0.26 | 0.24 | 0.22 | 0.21 |
| | Thickness T1 [mm] | 0.38 | 0.28 | 0.26 | 0.25 | 0.23 | 0.22 | 0.21 | 0.20 |
| | W1/D1 | 2.50 | 1.69 | 1.21 | 1.03 | 0.87 | 0.81 | 0.72 | 0.71 |
| | Evaluation of ease of drawing | C | B | A | A | A | A | A | D |

INDUSTRIAL APPLICABILITY

According to one or more embodiments of the present disclosure, it can be possible to efficiently perform shaping and decoration of a personal care product having a desired shape and dimensions, with high shape accuracy and high dimensional accuracy.

Embodiments of the disclosed subject matter can also be as set forth according to the following parentheticals.

(1) A method for producing a personal care product applicable to a human body, the method comprising: a forming step in which a nozzle is moved relative to the object while a composition having fluidity is supplied from the nozzle to the object to form a deposit derived from the composition on the object, wherein the nozzle has a nozzle diameter of 0.01 mm or more and 2 mm or less, and in the forming step, the composition is supplied in such a manner that a ratio of a distance between a tip of the nozzle and the object to the nozzle diameter (distance/nozzle diameter) is set to 0.35 or more and less than 3.

(2) The method for producing a personal care product according to (1), wherein a viscosity of the composition at a temperature at which the composition is supplied from the nozzle is 0.1 Pas or more and 1 000 Pa·s or less.

(3) The method for producing a personal care product according to (1) or (2), wherein the nozzle has the nozzle diameter of 0.1 mm or more.

(4) The method for producing a personal care product according to any one of (1) to (3), wherein the nozzle has the nozzle diameter of 1 mm or less.

(5) The method for producing a personal care product according to any one of (1) to (4), wherein in the forming step, the ratio of the distance between the tip of the nozzle and the object to the nozzle diameter (distance/nozzle diameter) is 0.5 or more.

(6) The method for producing a personal care product according to any one of (1) to (5), wherein in the forming step, the ratio of the distance between the tip of the nozzle and the object to the nozzle diameter (distance/nozzle diameter) is 2.5 or less.

(7) The method for producing a personal care product according to any one of (1) to (6), wherein a thickness of the deposit is 0.05 mm or more.

(8) The method for producing a personal care product according to any one of (1) to (7), wherein the thickness of the deposit is 1 mm or less.

(9) The method for producing a personal care product according to any one of (1) to (8), wherein the personal care product is a cosmetic product, a soap, an aroma candle, or a bathing agent.

(10) The method for producing a personal care product according to any one of (1) to (9), wherein one or more deposits other than the deposit are formed on the object.

(11) The method for producing a personal care product according to any one of (1) to (10), wherein after a first forming step is performed, a moving step is performed in which the nozzle is moved relative to the object on the same plane with supply of the composition from the nozzle stopped and, then a second forming step is performed to form one or more deposits other than the deposit on the object.

(12) The method for producing a personal care product according to any one of (1) to (11), wherein after the first forming step is performed, a second forming step is further performed to form one or more deposits other than the deposit on the deposit.

(13) The method for producing a personal care product according to any one of (1) to (12), wherein after the forming step is performed, a moving step in which the nozzle is moved relative to the object on the same plane with the supply of the composition from the nozzle stopped is further performed, wherein the forming step and the moving step are repeatedly performed in this order to form one or more deposits other than the deposit on the deposit.

(14) The method for producing a personal care product according to any one of (1) to (13), wherein the temperature of the composition supplied from the nozzle is 30° C. or less.

(15) The method for producing a personal care product according to any one of (1) to (14), wherein the composition is a mixture comprising liquid and powder.

(16) The method for producing a personal care product according to any one of (1) to (15), wherein the liquid in the composition includes water.

(17) The method for producing a personal care product according to any one of (1) to (16), wherein the composition is a mixture comprising liquid and powder, and a content of the powder in a solid content of the deposit derived from the composition is 70 mass % or more.

(18) The method for producing a personal care product according to any one of (1) to (17), wherein the composition is a mixture of liquid and powder, and the content of the powder in the solid content of the deposit derived from the composition is 99 mass % or less.

(19) The method for producing a personal care product according to any one of (1) to (18), wherein an average particle size of the powder in the composition is smaller than the nozzle diameter and, in a case where the nozzle does not have a perfect circular shape in cross section, the average particle size of the powder in the composition is preferably smaller than a minimum length of the nozzle in cross section.

(20) The method for producing a personal care product according to any one of (1) to (19), wherein a ratio of the average particle size of the powder in the composition to the nozzle diameter (average particle size/nozzle diameter) is 0.001 or more and 1 or less.

(21) The method for producing a personal care product according to any one of (1) to (20), wherein the forming step is performed in such a manner that a ratio of a relative moving speed of the nozzle relative to the object in a plane direction to a supply speed of the composition from the nozzle is set to 0.1 or more.

(22) The method for producing a personal care product according to any one of (1) to (21), wherein the forming step is performed in such a manner that a ratio of a relative moving speed of the nozzle relative to the object in a plane direction to a supply speed of the composition from the nozzle is set to 2 or less.

(23) The method for producing a personal care product according to any one of (1) to (22), wherein a supply amount of the composition from the nozzle is 0.05 mm³/s or more.

(24) The method for producing a personal care product according to any one of (1) to (23), wherein a supply amount of the composition from the nozzle is 150 mm³/s or less.

(25) The method for producing a personal care product according to any one of (1) to (24), wherein a first deposit is formed by performing the first forming step such that a deposition region, in which the deposit is present on the object, and a non-deposition region, in which no deposit is present on the object, are formed when the object is viewed in a plan view and, then a second deposit is formed in the non-deposition region by performing the second forming step in which a composition same as or different from the composition supplied in the first forming step is supplied.

(26) The method for producing a personal care product according to any one of (1) to (25), wherein the non-deposition region is formed so as to be surrounded by the deposition region when the object is viewed in a plan view.

(27) The method for producing a personal care product according to any one of (1) to (26), wherein the second deposit is formed in an entire region of the non-deposition region.

(28) The method for producing a personal care product according to any one of (1) to (27), wherein a third forming step, in which a composition same as or different from the composition supplied in the first forming step or the composition supplied in the second forming step is supplied, is further performed to form a third deposit on the first deposit and the second deposit, thus making a three-dimensional shaped body.

(29) The method for producing a personal care product according to any one of (1) to (28), wherein the second deposit is transparent.

(30) The method for producing a personal care product according to any one of (1) to (29), wherein the first deposit is colored.

(31) The method for producing a personal care product according to any one of (1) to (30), wherein a three-dimensional structure is formed in which the first deposit is colored, and the second deposit is transparent.

(32) The method for producing a personal care product according to any one of (1) to (31), wherein the object is a paper, a film, a nonwoven fabric, a metal, a resin, or a personal care product and/or wherein the composition is linearly continuously supplied from the nozzle toward the object.

(33) A personal care product including a three-dimensional shaped body formed by a linear body, wherein a line width of the linear body as viewed in a plan view is 1 mm or less.

(34) The personal care product including the three-dimensional shaped body formed by the linear body according to (33), wherein the line width of the linear body as viewed in a plan view is 0.05 mm or more.

(35) The personal care product according to (33) or (34), wherein the linear body contains, as a solid content, 70 mass % or more.

(36) The personal care product according to any one of (33) to (35), wherein the linear body contains, as a solid content, 99 mass % or less of the powder.

(37) The personal care product according to any one of (33) to (36), wherein a thickness of the linear body is 0.05 mm or more.

(38) The personal care product according to any one of (33) to (37), wherein a thickness of the linear body is 1 mm or less.

(39) The personal care product according to any one of (33) to (38), wherein a design of the personal care product that is visually recognizable is formed by the linear body.

(40) The personal care product according to any one of (33) to (39), wherein the three-dimensional shaped body has a laminated structure where a plurality of the linear bodies are laminated.

(41) The personal care product according to any one of (33) to (40), wherein a composition containing a cosmetic is formed in a state of being further disposed in an entire region surrounded by the three-dimensional shaped body as viewed in a plan view, and the composition has a formulation same as or different from a formulation of the composition of the linear body.

(42) The personal care product according to any one of (33) to (41), wherein a plurality of layers are provided, and a different design is visually recognized in each of the plurality of layers.

(43) The personal care product according to any one of (33) to (42), wherein the linear body is transparent and a region surrounded by the linear body is colored, thus forming a design of the personal care product that is visually recognizable from an outside.

The invention claimed is:

1. A method for producing a personal care product applicable to a human body, the method comprising:
   forming a deposit derived from a composition having fluidity on an object, said forming including moving a nozzle relative to the object while the composition is supplied from the nozzle to the object wherein
   the nozzle has a nozzle diameter of 0.01 mm or more and 2 mm or less,
   in said forming, the composition is supplied such that a ratio of a distance between a tip of the nozzle and the object to the nozzle diameter is set to 0.35 or more and less than 3,
   the composition is linearly continuously supplied from the nozzle toward the object,
   in said forming, the composition is supplied such that a ratio of relative moving speed of the nozzle relative to the object in a plane direction to a supply speed of the composition from the nozzle is set to 0.1 or more and 2 or less, and
   a viscosity of the composition at a temperature at which the composition is supplied from the nozzle is 0.1 Pa·s or more and 1 000 Pa·s or less.

2. The method for producing a personal care product according to claim 1, wherein the viscosity of the composition at the temperature at which the composition is supplied from the nozzle is 1 Pa·s or more and 200 Pa·s or less.

3. The method for producing a personal care product according to claim 1, wherein the composition contains a volatile solvent, and the method further comprises, after said forming, drying the composition.

4. The method for producing a personal care product according to claim 1, wherein the composition is a melt obtained by heat melting.

5. The method for producing a personal care product according to claim 1, wherein for said forming, the ratio of the distance between the tip of the nozzle and the object to the nozzle diameter is 0.55 or more and 2 or less.

6. The method for producing a personal care product according to claim 1, wherein for said forming, the distance between the tip of the nozzle and the object is 0.15 mm or more and 0.70 mm or less.

7. The method for producing a personal care product according to claim 1, wherein a thickness of the deposit is 0.05 mm or more and 1 mm or less.

8. The method for producing a personal care product according to claim 1, wherein the nozzle diameter is 0.2 mm or more and 0.6 mm or less.

9. The method for producing a personal care product according to claim 1, wherein the personal care product is a cosmetic product, a soap, an aroma candle, or a bathing agent, and/or the object is a paper, a film, a nonwoven fabric, a metal, a resin, or the personal care product.

10. The method for producing a personal care product according to claim 1, wherein said forming includes forming one or more deposits other than the deposit on the object.

11. The method for producing a personal care product according to claim 1, wherein the temperature of the composition supplied from the nozzle is 30° C. or less.

12. The method for producing a personal care product according to claim 1, wherein the composition is a mixture comprising liquid and powder, and an average particle size of the powder is 1 μm or more.

13. The method for producing a personal care product according to claim 1, wherein the composition is a mixture comprising liquid and powder, and a content of the powder in a solid content of the deposit derived from the composition is 70 mass % or more and 99 mass % or less.

14. The method for producing a personal care product according to claim 1, wherein said forming step is performed such that a ratio of a relative moving speed of the nozzle relative to the object in a plane direction to the supply speed of the composition from the nozzle is 1.5 or less.

15. The method for producing a personal care product according to claim 1, wherein a supply amount of the composition from the nozzle is 0.05 mm³/s or more and 150 mm³/s or less.

16. The method for producing a personal care product according to claim 1, wherein a first deposit is formed by performing said forming step such that a deposition region, in which the deposit is present on the object, and a non-deposition region, in which no deposit is present on the object, are formed when the object is viewed in a plan view and, then a second deposit is formed in the non-deposition region by performing said forming again, in which a composition thereof is the same as or different from the composition supplied in forming the first deposit.

17. The method for producing a personal care product according to claim 16, wherein the non-deposition region is formed so as to be surrounded by the deposition region when the object is viewed in the plan view.

18. The method for producing a personal care product according to claim 16, wherein the second deposit is formed in an entire region of the non-deposition region.

19. The method for producing a personal care product according to claim 16, wherein a third deposit is formed over the first deposit and the second deposit, in which a composition thereof is the same as or different from the composition supplied in forming the first deposit or the composition supplied in forming the second deposit, thus making a three-dimensional shaped body.

20. The method for producing a personal care product according to claim 19, wherein the second deposit is transparent and the first deposit is colored.

* * * * *